F. A. STICH.
LADDER MAKING MACHINE.
APPLICATION FILED SEPT. 11, 1914.
1,145,713.
Patented July 6, 1915.
2 SHEETS—SHEET 1.
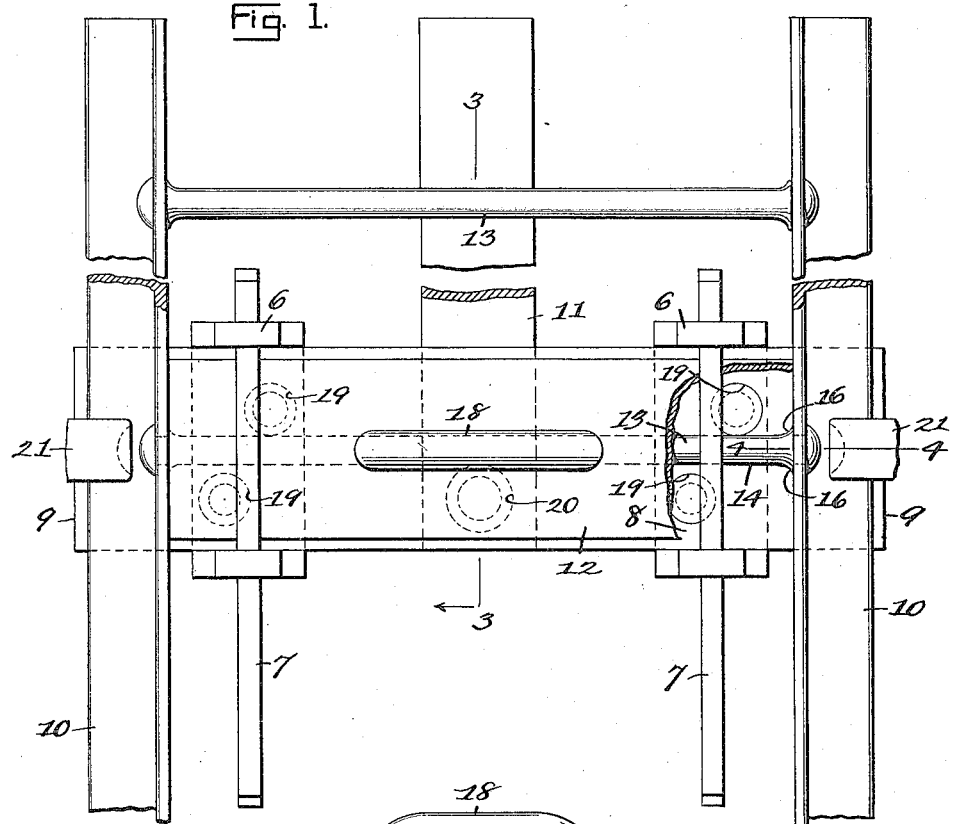
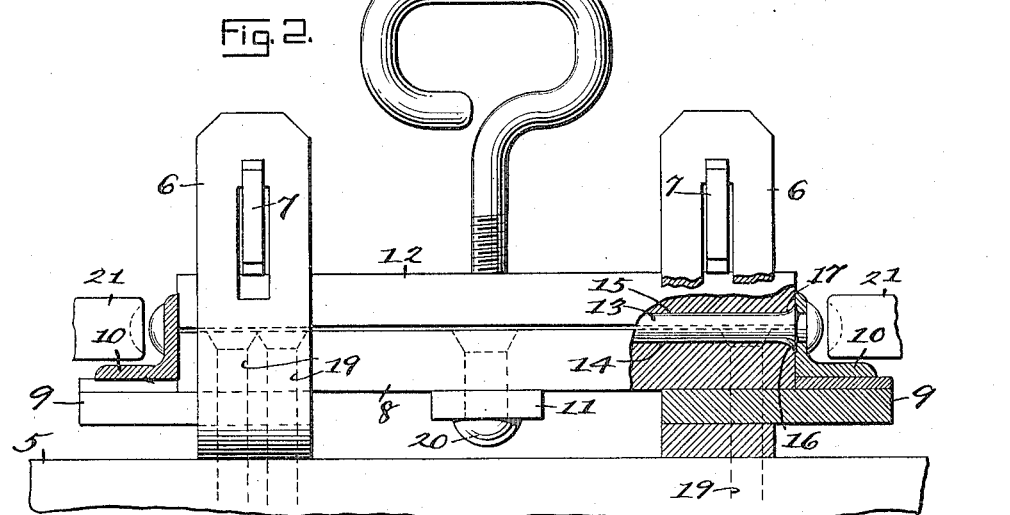
WITNESSES
Chas. H. Leihman.
J. C. Larsen
INVENTOR
Fredric A. Stich
BY
ATTORNEYS F. A. STICH.
LADDER MAKING MACHINE.
APPLICATION FILED SEPT. 11, 1914.
1,145,713.
Patented July 6, 1915.
2 SHEETS—SHEET 2.
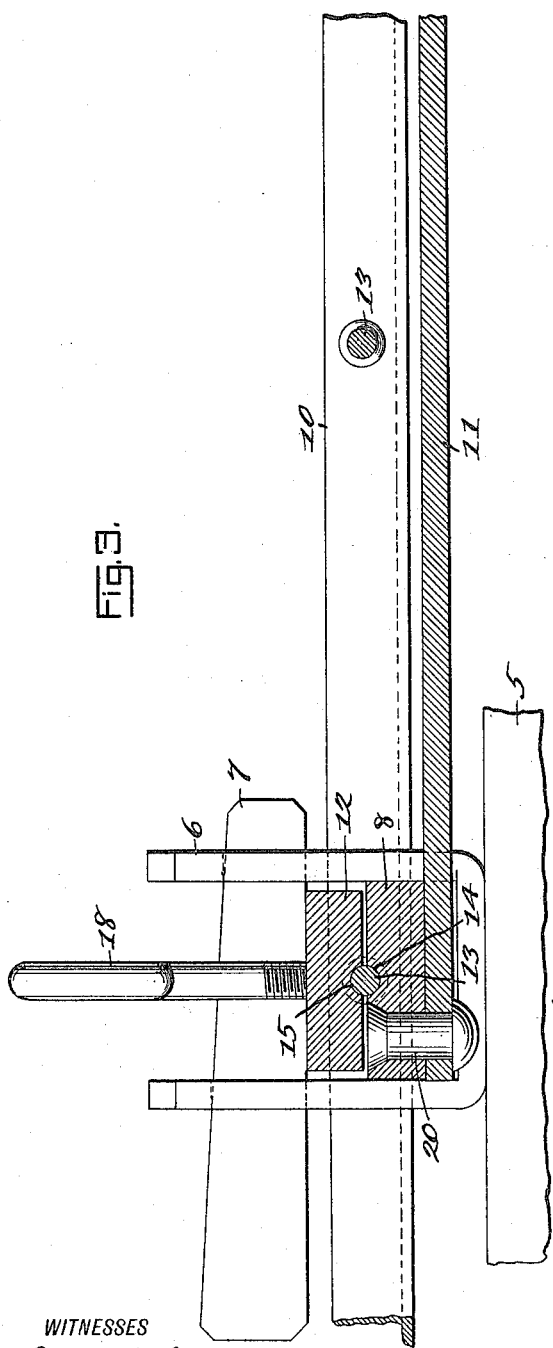
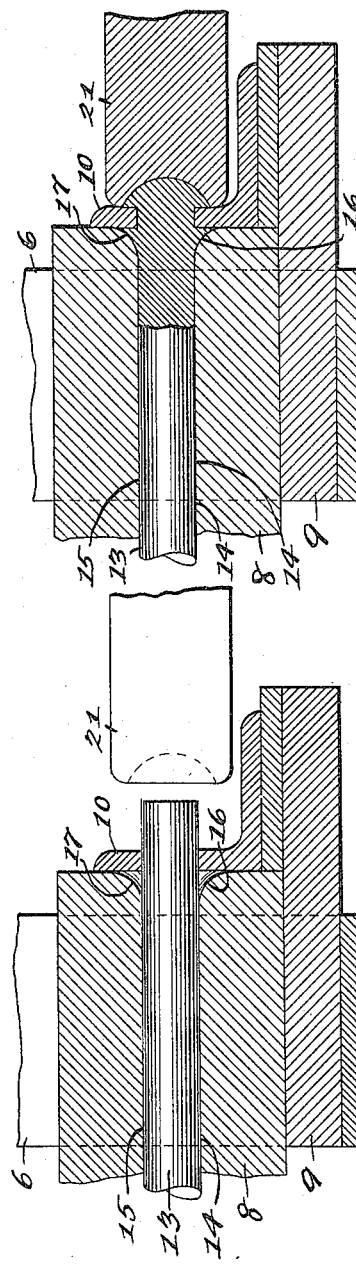
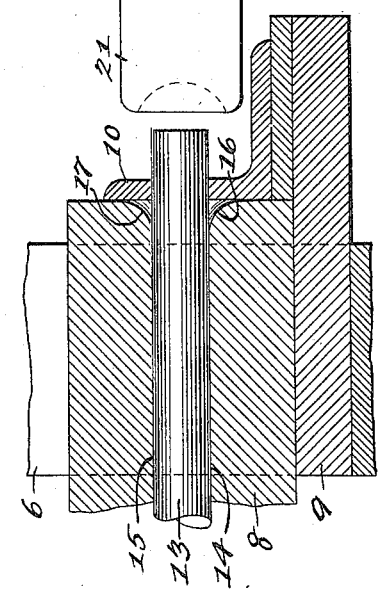
WITNESSES
INVENTOR
Fredric A. Stich
BY
ATTORNEYS

UNITED STATES PATENT OFFICE.

FREDRIC A. STICH, OF MOUNT VERNON, ILLINOIS.

LADDER-MAKING MACHINE.

1,145,713.  Specification of Letters Patent.  Patented July 6, 1915.

Application filed September 11, 1914. Serial No. 861,218.

*To all whom it may concern:*

Be it known that I, FREDRIC A. STICH, a citizen of the United States, and a resident of Mount Vernon, in the county of Jefferson and State of Illinois, have invented certain new and useful Improvements in Ladder-Making Machines, of which the following is a specification.

My invention relates to a machine for manufacturing ladders, particularly those used upon railway cars, and the main object thereof is to provide such a machine whereby a rung or round is shouldered and riveted in the two side stringers in one operation and with but one heating of the said round.

A further object is to provide such a machine which permits of quick and easy shifting of the incomplete ladder from the position of one round to that of another.

A further object is to provide means for maintaining the relationship of the stringers with the round being assembled therein; and further objects are to provide such machines which are simple in construction and operation, rapid and positive of result, composed of but few parts not likely to get out of order to require repair, and comparatively inexpensive.

My invention is fully described in the following specification, of which the accompanying drawings form a part, in which the separate parts are designated by the same reference in each of the views, and in which:—

Figure 1 is a plan view of my machine, with the incomplete ladder therein, in course of construction; Fig. 2 is an end view thereof, partly in section; Fig. 3 is a section taken on the line 3—3 of Fig. 1; Fig. 4 is an enlarged section on the line 4—4 of Fig. 1, and showing the round previous to being upset; and Fig. 5 is a similar view, with the round complete, and partly in section.

In the drawings forming a part of this application I have shown a base 5 having two vertical guides 6 thereon for wedges 7, a bottom member 8 extended across over said guides, interposed, extended, fillers 9 serving as guides for the stringers 10 of the ladder, a transversely arranged bar 11, and an upper member 12; the members 8 and 12 comprise clamping members for a rod designed to be a round 13, and are provided with grooves 14 and 15, respectively, for the reception of said round, and the ends of said grooves are outwardly flared, as shown at 16 and 17, respectively. The members 8 and 12 are of a length equaling the width of the proposed ladder, between stringers, and are easily substituted by others for ladders of different widths, and I also provide a staple 18, or equivalent, whereby the member 12 may be lifted from the member 8, to remove an assembled round from between the same, or to introduce another round, and whereby the member 12 may be dipped in water, when heated.

The base 5, wedge guides 6, member 8, and fillers 9, are secured together by means of bolts 19, indicated by dotted lines, and I also provide a bolt 20 for holding the bar 11 to the member 8, but the exact construction of these parts is immaterial, provided, however, that the clamping members 8 and 12 are of the proper length, are grooved, and the ends of the grooves flared as shown.

In practice, the stringers 10 are arranged in position, a section of rod designed to be the round inserted into the previously formed bores in said stringers, the rod section being arranged in the groove 14 of the member 8, after which the member 12 is placed over the member 8 with the rod section in the groove 15, and the wedges 7 placed in their respective guides and driven home, thereby holding the rod section against movement in said members 8 and 12. Before the said rod section is placed within the machine it is thoroughly heated, to a white heat or in any desirable degree, after which it is locked in the machine, as stated, and pneumatic hammers applied to both ends of said rod section at the same time, the rivet head forming blocks being shown at 21. The first blows of the hammers have the effect of driving the heated metal inwardly, thus expanding the same in the position of the flared recesses of the grooves in the members 8 and 12, and, when said recesses are completely filled, the metal completely fills the bores in the stringers 10, after which the ends of the rod section are flared to form the rivet heads, and the assembling of this round is complete, it being understood that the lengths of the rod sections are gaged in accordance with the width of the proposed ladder, whereby no surplus metal remains after the rivet heads are formed. The wedges 7 are then driven out of their guides, and the upper member 12 removed, after which the stringers 10, with the assembled round or rounds, are moved to bring the next bores into alinement with the groove 14 of the member 8, a new rod section heated and placed in position, the member 12 and clamping wedges replaced, and the shoulders and rivet heads of this rod section upset with the hammers, and this continues, round by round, until the ladder is complete, the bar 11 serving to support the assembled portion of the ladder. It will thus be seen that the stringers are maintained in absolute parallelism, and the rounds assembled absolutely perpendicular thereto, resulting in a symmetrical ladder, and this, being accomplished with but one heating of each rod section, renders the construction of a ladder very rapid; further, the present method of first forming the shoulders is dispensed with, and the result is a rigid and very economical ladder. It will also be observed that the stringers may be of any sectional formation, and may also carry the brackets by which they are secured to a car, or the like, or the stringers may be so arranged as to have their flanges outward which permits the ends thereof to be upset or bent to give a desired clearance and thus eliminate the extra cleats or fastenings for attachment to a car.

My invention is very simple, efficient, rapid, positive, and economical of time and material, and, while I have shown a present form of embodiment, I do not limit myself thereto, but may make changes thereover, within the scope of the following claims, without departing from the spirit of my invention, or sacrificing its advantages.

Having fully described my invention, what I claim as new, and desire to secure by Letters Patent, is:—

1. A ladder making machine, comprising a base having substantially parallel, shouldered, supports thereon for spacing the stringers and maintaining them in parallelism, means for maintaining a round in proposed position, and means for simultaneously forming a shoulder and a head at each end of said round, the former on the interior and the latter on the exterior of the corresponding stringer.

2. A ladder making machine, comprising a base, guides for the stringers thereon, means for clamping a round in the proposed position, means for simultaneously forming a shoulder inside of and a head outside of the corresponding stringer, at each end of said round, and means for guiding the completed portion of the ladder.

3. A ladder making machine, comprising a base, a grooved clamping member thereon, a supplemental grooved clamping member above said first named member, means for clamping said members together with a round therebetween, the ends of said grooves being flared to form fillets on said round, means for maintaining the stringers in parallelism, and means for forcing the ends of said rounds inwardly to form said fillets and heads on said rounds simultaneously.

In testimony whereof I have signed my name to this specification in the presence of two subscribing witnesses.

FREDRIC A. STICH.

Witnesses:
W. B. PHILLIPS,
W. N. ATKINSON.

Copies of this patent may be obtained for five cents each, by addressing the "Commissioner of Patents, Washington, D. C."